United States Patent Office 3,496,206
Patented Feb. 17, 1970

3,496,206
METHOD FOR MAKING SILICON HYDRIDES
Abe Berger, Schenectady, N.Y., assignor to General Electric Company, a corporation of New York
No Drawing. Continuation-in-part of application Ser. No. 360,744, Apr. 17, 1964. This application June 1, 1967, Ser. No. 642,713
Int. Cl. C07f 7/08
U.S. Cl. 260—448.2                     11 Claims

ABSTRACT OF THE DISCLOSURE

A method is provided for converting organosilicon halides, for example, halosilanes and bis(halosilyl)hydrocarbons, to the corresponding hydrides. Silicon halide reduction is effected by utilizing an alkali metal hydride, such as sodium hydride, in the presence of an alkylaluminumhalide.

This application is a continuation-in-part of my copending application S.N. 360,744, filed Apr. 17, 1964, now abandoned and assigned to the same assignee as the present invention. Prior to the present invention, various methods were known for reducing silicon halides as illustrated by the equation, (1)
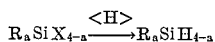

where R is selected from monovalent hydrocarbon radicals and halogenated monovalent hydrocarbon radicals, X is a halogen radical, and $a$ is an integer equal to from 1 to 3, inclusive. One method that can be used to reduce silicon halides involves the use of lithium aluminumhydride in an ether solvent. Although this procedure can be satisfactorily employed for making a variety of silicon hydrides, those skilled in the art know that it is not economically feasible to utilize lithium aluminumhydride in commercial operations. Other methods are shown by Jenkner, Patents 3,043,857 and 3,100,788. These patents show the reduction of halides of certain Group IV elements, for example, organohalosilanes, by the employment of sodium hydride utilizing hydrogen gas under pressure, or a combination of sodium hydride and a promoter in the form of a metallic organic compound such as an alkylaluminum. These methods achieve effective results but have many limitations. For example, the employment of in situ sodium hydride utilizing hydrogen gas under pressure in combination with sodium metal, requires the use of high pressure equipment. Such equipment can be expensive and present a safety hazard. Alternatively, although the alkylaluminum can be employed effectively to reduce organohalosilanes substituted with monovalent hydrocarbon radicals, the use of alkylaluminums often present problems of contamination. For example, in instances where the boiling points of the resulting silicon hydride and alkylaluminum overlap, separation of the silicon hydride free of alkylaluminum often can be extremely difficult. In addition, when alkylaluminums are employed to promote the reduction of organohalosilane, reaction times can often exceed 24 hours or more and yields of the corresponding silicon hydride are low.

The present invention is based on my discovery that if an alkali metal hydride is used in combination with an alkylaluminum halide, in place of an alkylaluminum, to effect the reduction of an organosiliconhalide selected from organohalosilanes of formula:

(2)  $R_aH_bSiX_{(4-a-b)}$ or bis(halosilyl)hydrocarbons of the formula:

(3)  

the resulting organosiliconhydrides can be recovered readily in quantitative yields free of alkylaluminum compound contamination, where R, X, and $a$ are defined above, R' is a divalent hydrocarbon radical, $b$ is a whole number which has a value equal to 0 to 2 inclusive, $c$ is a whole number which has a value equal to 0 to 2 inclusive, $d$ is a whole number which has a value equal to from 0 to 2 inclusive, $e$ is a whole number which has a value equal to 0 to 2 inclusive, $f$ is a whole number which has a value equal to 0 to 2 inclusive, the sum of $a$ and $b$ has a value equal to 1 to 3 inclusive, the sum of $c$ and $d$ has a value equal to 0 to 2 inclusive, and the sum of $e$ and $f$ has a value equal to 0 to 2 inclusive. In addition to obtaining organosiliconhydride in yields as high as 95 percent when using alkylaluminumhalide promoters, reaction times as little as one-half hour or less under atmospheric conditions are often feasible. Recovery of organosiliconhydride free of alkylaluminum compound contamination also is achieved. Unlike alkylaluminums, alkylaluminumhalides, as taught in Chemistry and Industry, page 1492, Sept. 16, 1961, readily complex with alkali metal halide formed in the reaction mixture, resulting in the formation of a stable material, which does not readily volatilize.

In accordance with the practice of the present invention, there is provided a method for making organosiliconhydride selected from silanes of the formula:

(4)  $R_aSiH_{4-a}$ and bis(silyl)hydrocarbons of the formula:

(5)  

which comprises (1) reacting an alkali metal hydride and organosiliconhalide selected from Formula 2, and Formula 3, in the presence of an effective amount of an alkylaluminumhalide, and (2) recovering from (1), said organosiliconhydride, where R, R', $a$, $d$, and $e$ are as defined above.

Radicals included by R of Formula 1 are, for example, aryl radicals and halogenated aryl radicals, such as phenyl, chlorophenyl, napthyl, chloronapthyl, etc.; aliphatic radicals such as for example, methyl, ethyl, n-propyl, isopropyl, n-butyl, sec-butyl, tert-butyl, amyl, hexyl, heptyl, octyl, dodecyl, pentadecyl, octadecyl; alkenyl radicals such as vinyl, 1-propenyl, allyl, etc.; cycloalkyl radicals such as cyclohexyl, cycloheptyl, etc.; haloalkyl radicals such as chlorobutyl, chloroamyl, chlorooctyl, chlorodecyl, etc. Radicals included by R' are arylene radicals such as phenylene, napthylene, anthrylene, etc.; alkylene radicals such as methylene, ethylene, propylene, butylene, pentylene, etc.

Organohalosilanes included by Formula 2 are for example, methyltrichlorosilane, methylphenyldichlorosilane, methyldichlorosilane, ethyltrichlorosilane, ethylchlorosilane, n-propyltrichlorosilane, n-butyltrichlorosilane, n-amyltrichlorosilane, n-amyldichlorosilane, n-amyclhlorosilane, n-hexyltrichlorosilane, n-hexyldichlorosilane, n-hexylchlorosilane, phenyltrichlorosilane, chlorophenyltrichlorosilane, isopropyldichlorosilane, diphenyldichlorosilane, diphenylchlorosilane, n-propyl, n-octyldichlorosilane, tri-n-propylchlorosilane, etc.

Bis(halosilyl)hydrocarbons included by Formula 3 are for example, bis(chlorodimethylsilyl)methane, bis(trichlorosilyl)methane, 1,2-bis(trichlorosilyl)ethane, 1,2-bis(dichlorosilyl)ethane, 1,3-bis(trichlorosilyl)propane, 1,4 - bis(methyldibromosilyl)butane, 1,8-bis(dichlorosilyl)octane, p-bis(dichlorosilyl)benzene, etc.

Included by the alkali metal hydrides that can be employed in the present invention are, for example, sodium hydride, potassium hydride, lithium hydride, rubidium hydride, and cesium hydride. Preferably, sodium hydride is employed in the method of the present invention. The

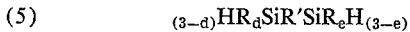

alkylaluminumhalides that can be employed in the practice of the invention include alkylaluminumhalide having formula, (6) $\qquad (R'')_g Al(X)_{3-g}$ where X is as previously defined, R" is an alkyl radical having from 1 to 8 carbon atoms, and g is an integer equal to from 1 to 2 inclusive. There are included for example, alkylaluminumhalides, such as ethylaluminumdichloride, methylaluminumdichloride, diethylaluminumchloride, dimethylaluminumchloride, methylaluminumdifluoride, etc.; mixtures of such alkylaluminumhalides such as methylaluminumsesquichloride, ethylaluminumsesquichloride, etc., are also operable. Methods for making the aforementioned alkylaluminumhalides can be found in Aristid v. Grosse and Juliam M. Mavity, Journal of Organic Chemistry, vol. 5, No. 2 (March 1940).

In the practice of the invention, organosilicon halide such as shown by Formula 2 or Formula 3 is reacted with alkali metal hydride in the presence of alkylaluminumhalide. The resulting organosilicon hydride is recovered from the mixture by distillation, etc.

Although the order of addition of the various reactants is not critical, it is preferred to add the organosiliconhalide to a mixture of the alkali metal hydride and organoaluminumhalide. During the addition, agitation of the mixture can be employed as well as the use of a solvent. In certain instances, the organosiliconhalide can be employed as a solvent. It is preferred however, to employ a substantially inert organic solvent such as hexane, heptane, hexadecane, benzene, toluene, xylene, tetrahydrofuran, mineral oil, etc. A substantially inert organic solvent is a solvent which is substantially inert to the reactants under reaction conditions. Desirable results can be achieved if there is utilized in the reaction mixture sufficient alkali metal hydride to provide for at least one mole of chemically combined hydrogen, per mole of halogen chemically bonded to silicon metal. However, more or less alkali metal hydride can be utilized without interfering with the unexpected results achieved by the invention, such as in instances where the organosiliconhalide is utilized as the solvent. Preferably, there is utilized from about 0.05 mole to about 0.7 mole of alkylaluminumhalide, per mole of organosiliconhalide. A smaller amount of alkylaluminumhalide can be employed, but it can result in extended reaction times; larger amounts of alkylaluminumhalide can substantially promote rate of reaction. It has been found that an effective amount of alkylaluminumhalide is from 0.01 mole to 1 mole, per mole of organosiliconhalide.

A temperature in the range of between about −20° C. to 150° C. can be employed. It is preferred however, to utilize a temperature between 100° C. to 130 C. Experience has shown that optimum results are achieved if a substantially moisture free and oxygen free atmosphere is maintained during the reaction due to the instability of the alkylaluminumhalides. Air and moisture can be excluded by use of previously dried inert gases such as nitrogen, helium, etc., in accordance with well known techniques. Depending upon such factors as the conditions utilized, proportions or reactants, etc., a reaction time of as little as ½ hour or less, to 3 hours or more, will not be unusual. The course of the reaction can be followed by examining samples of the reaction mixture periodically by use of a vapor phase chromatograph.

In order that those skilled in the art will be better able to practice the invention, the following examples are given by way of illustration and not by way of limitation. All parts are by weight.

EXAMPLE 1

There was added dropwise under an inert atmosphere of nitrogen, a solution of 75 parts of diphenyldichlorosilane in 50 parts of mineral oil to a mixture at 110° C. of 138 parts of mineral oil, 18 parts of sodium hydride, and 3 parts of methylaluminumsesquichloride. The mixture was maintained at a temperature of 100° C. for three hours and 6 additional parts of methylaluminumsesquichloride were added. After one hour, the temperature of the mixture rose to 150° C. due to exothermic heat. The reaction mixture was then cooled and maintained at a temperature of 110° C. for two additional hours. The mixture was then distilled and there was obtained an 87 percent yield of product. Based on method of preparation and its I.R. spectrum, the product was diphenylsilane.

The above reaction was repeated except that in place of the methylaluminumsesquichloride, there was substituted triethylaluminum. After the 6 additional parts of triethylaluminum were added to the mixture, it was kept at 100° C. for an additional 8 hours. The mixture was then examined by VPC and it showed only about 2 percent by weight of diphenylsilane. This yield was confirmed by infrared which showed only a trace of silicon hydride. An attempt to distill the mixture to recover the diphenylsilane resulted in a low yield of product contaminated with large amounts of triethylaluminum.

EXAMPLE 2

There was added a solution of 205 parts of amyltrichlorosilane and 400 parts of xylene to a mixture of 72 parts of sodium hydride dispersed in 72 parts of mineral oil and 25 parts of methylaluminumsesquichloride. An exothermic reaction occurred. After the reaction subsided, the mixture was distilled. There was obtained a 93 percent yield of product having a boiling point of 80° C. at 760 mm., based on starting amyltrichlorosilane. The identity of the product, amylsilane, was confirmed by its infrared spectrum and its vapor phase chromatograph.

The above reaction was repeated, except in place of the methylaluminumsesquichloride, there were utilized 25 parts of triethylaluminum. After the amyltrichlorosilane was added, there was an exothermic reaction and the temperature rose to 115° C. When the reaction had subsided, the mixture was distilled under reduced pressure. There were obtained 30.6 parts of amylsilane having a boiling point of 80° C. to 81° C. at 760 mm., which represented a yield of about 60 percent.

EXAMPLE 3

There were added 20.5 parts of amyltrichlorosilane to a mixture heated to 120° C. of 14.4 parts of a 50 percent dispersion of sodium hydride in mineral oil, 50 parts of xylene, and 3 parts of dimethylaluminumchloride. During the addition, exothermic heat was produced. The reaction was completed in about ½ hour, and the mixture was distilled under reduced pressure. There was obtained a 95 percent yield of amylsilane having a boiling point of 80° C. to 81° C. at 760 mm.

EXAMPLE 4

There were added 21.9 parts of hexyltrichlorosilane to a mixture heated to 120° C. under an inert atmosphere of 14.4 parts of a 50 percent dispersion of sodium hydride in mineral oil, 50 parts of xylene and 3 parts of ethylaluminumsesquichloride. An exothermic reaction occurred and thereafter the temperature was controlled by the rate of addition. After one hour, the addition was completed; the resulting product was distilled under reduced pressure. A 96 percent yield of hexylsilane was obtained having a boiling point of 112° C. to 114° C. at 760 mm. Its identity was confirmed by its I.R. spectrum.

EXAMPLE 5

There were gradually added 4 parts of methylaluminumsesquichloride to a mixture of 7.2 parts of sodium hydride and 41 parts of amyltrichlorosilane. An exothermic reaction occurred resulting in a temperature rise of 35° C. The mixture was refluxed to a temperature of 110° C. for a 12 hour period. The reaction mixture was then flash distilled resulting in the recovery of a 35 percent yield of amylsilane. The same procedure was repeated except that various alkylaluminums were substituted for the methylaluminumsesquichloride. In certain instances, larger amounts of the alkylaluminums were utilized. The following table shows the alkylaluminum compounds employed followed by parts of compound utilized; yield of product obtained after a 12 hour reaction period also is shown.

| | Yield of amylsilane (percent) |
|---|---|
| 4 parts methylaluminumsesquichloride | 35 |
| 4 parts triethylaluminum | 9.7 |
| 8 parts diisobutylaluminumhydride | 8.2 |
| 8 parts triisobutylaluminum | 7.7 |

EXAMPLE 6

There are added a mixture consisting of 13.6 parts of amylchlorosilane and 17.1 parts of amyldichlorosilane to a mixture which has been heated to 100° C. of 14.4 parts of a 50 percent dispersion of sodium hydride in mineral oil, 75 parts of xylene, and 8 parts of methylaluminumsesquichloride. After the addition, the temperature of the mixture is maintained at 110° C. to 115° C. for an additional ½ hour. The mixture is then distilled under reduced pressure. There is obtained 18 parts of amylsilane boiling between 80° C. to 83° C. This represents a yield of about 90 percent, based on the starting reactants.

EXAMPLE 7

There were injected 40 parts of a solution of ethylaluminumsesquichloride, present as a 20 percent solution in xylene into a flask containing 75 parts of xylene and 14.4 parts sodium hydride which was employed as a 50 percent dispersion in mineral oil. A mild exothermic reaction occurred. The mixture was then heated to 130° C. There was then added dropwise, 38.1 parts of 1,8-bis(trichlorosilyl)octane. A mild exothermic reaction occurred. The temperature of the mixture was maintained at 145° C. The mixture was maintained at 145° C. for two additional hours after the addition. It was then cooled, filtered and fractionated. There was obtained 12.5 parts of product boiling at 83° C., 15 mm. Based on method of preparation and its I.R. spectrum, the product was 1,8-bis(silyl)octane.

EXAMPLE 8

There were slowly added, 29.2 parts of 1,2-bis(trichlorosilyl)ethane, to a refluxing mixture of 14.4 parts sodium hydride, employed as a 50 percent dispersion in mineral oil, 75 parts of xylene and 40 parts of a 20 percent solution of ethylaluminumsesquichloride in xylene. After the addition, the mixture was refluxed for three additional hours. The mixture was then fractionated. There was obtained 7 parts of product which represented a 77 percent yield. It boiled at 46° C. at 760 mm. Based on its method of preparation and its I.R. spectrum the product was 1,2-bis(silyl)ethane.

EXAMPLE 9

There are added 14.9 parts of methyltrichlorosilane to a mixture at 120° C. of 7.2 parts sodium hydride employed as a 50 percent dispersion in mineral oil, 75 parts of xylene, and 3 parts of ethylaluminumsesquichloride. A rapid exothermic reaction occurs and a gas is evolved. The gas is collected in a cold trap. After the addition, the mixture is heated to reflux. Based on its I.R. spectrum and method of preparation the product collected is methylsilane. It is obtained at an 88 percent yield.

EXAMPLE 10

There were added slowly 52.6 parts of 1,4-bis-(dimethylchlorosilyl)benzene dissolved in an equal weight of toluene to a mixture at 120° C. consisting of about 60 parts of xylene, 9.6 parts of sodium hydride employed as a 59 percent dispersion in mineral oil and 4 parts of ethylaluminumsesquichloride. The addition of the 1,4-bis-(dimethylchlorosilyl)benzene resulted in sufficient exothermic heat to maintain the reaction temperature without the employment of external heat. Following the addition, the reaction mixture was heated to a temperature between 125° C.–135° C. for two additional hours. A VPC scan showed that the mixture was free of starting material, indicating that the reaction had gone to completion. The mixture was then filtered and the organic layer was distilled. There was obtained 34.2 parts of product having a boiling point of 93° C.–95° C. at 12 mm. Based on method of preparation and its I.R. spectrum, the product was 1,4-bis(dimethylsilyl)benzene.

EXAMPLE 11

There are added 32.5 parts of 1,4-bis(trichlorosilyl)-butane to a mixture at 130° C. consisting of about 130 parts of mineral oil, 14.4 parts of sodium hydride and 8 parts of ethylaluminumsesquichloride. During the addition, sufficient exothermic heat of reaction is produced to maintain the temperature without employing external heat. Following the addition, the mixture is maintained at a temperature between 120° C.–130° C. for three additional hours. A VPC scan of the mixture shows that the starting reactants have been completely consumed indicating that the reaction has gone to completion. The mixture is then cooled, filtered, and the product is flash distilled from the mineral oil solvent. There is obtained an 88 percent yield of 1,4-bis(silyl)butane. The identity of the product is confirmed by its I.R. spectrum.

While the foregoing examples have of necessity been limited to only a few of the very many variables within the scope of the present invention, it should be understood that the present invention is directed to a method of making a much broader class of organosiliconhydrides by effecting the reduction of organosiliconhalides shown by Formulae 2 and 3 by utilizing an alkali metal hydride in the presence of an effective amount of an alkylaluminumhalide such as shown by Formula 6.

What I claim as new and desire to secure by Letters Patent of the United States is:

1. A method for making silicon hydrides which comprises (1) reacting an alkali metal hydride and a silicon halide selected from the class consisting of organohalosilanes of the formula:

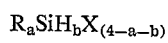

and bis(halosilyl)hydrocarbon of the formula:

in the presence of an effective amount of alkylaluminumhalide and (2) recovering organosiliconhydride from (1), where R is selected from monovalent hydrocarbon radicals and halogenated monovalent hydrocarbon radicals, R' is a divalent hydrocarbon radical, X is a halogen radical, $a$ is an integer esual to from 1 to 3, inclusive, $b$ is a whole number which has a value equal to 0 to 2 inclusive, $c$ is a whole number which has a value equal to 0 to 2 inclusive, $d$ is a whole number which has a value equal to from 0 to 2 inclusive, $e$ is a whole number which has a value equal to 0 to 2 inclusive, $f$ is a whole number which has a value equal to 0 to 2 inclusive, the sum of $a$ and $b$ has a value equal to 1 to 3 inclusive, the sum of $c$ and $d$ has a value equal to 0 to 2 inclusive, and the sum of $e$ and $f$ has a value equal to 0 to 2 inclusive.

2. A method in accordance with claim 1, where the organosiliconhalide is an organohalosilane of the formula:

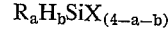

where R is selected from monovalent hydrocarbon radicals and halogenated monovalent hydrocarbon radicals, X is a halogen radical, and $a$ is an integer equal to from 1 to 3 inclusive, $b$ has a value equal to 0 to 2 inclusive, and the sum of $a$ and $b$ has a value equal to 1 to 3 inclusive.

3. A method in accordance with claim 1, where the organosiliconhalide is a bis(halosilyl)hydrocarbon of the formula:

where R is selected from monovalent hydrocarbon radicals and halogenated monovalent hydrocarbon radicals, R' is a divalent hydrocarbon radical, X is a halogen radical, $c$ has a value equal to 0 to 2 inclusive, $d$ has a value equal to from 0 to 2 inclusive, $e$ has a value equal to 0 to 2 inclusive, $f$ has a value equal to 0 to 2 inclusive, the sum of $c$ and $d$ has a value equal to 0 to 2 inclusive, and the sum of $e$ and $f$ has a value equal to 0 to 2 inclusive.

4. A method in accordance with claim 1, where the organosiliconhalide is 1,8-bis(trichlorosilyl)octane.

5. A method in accordance with claim 1, where the organosiliconhalide is 1,2-bis(trichlorosilyl)ethane.

6. A method in accordance with claim 1, where the organosiliconhalide is 1,4-bis(dichlorosilyl)butane.

7. A method in accordance with claim 1, where the organosiliconhalide is butyltrichlorosilane.

8. A method in accordance with claim 1, where the organosiliconhalide is hexyltrichlorosilane.

9. A method in accordance with claim 1, where the organosiliconhalide is amyltrichlorosilane.

10. A method in accordance with claim 1, where the organosiliconhalide is phenyltrichlorosilane.

11. A method in accordance with claim 1, where the organosiliconhalide is diphenyldichlorosilane.

References Cited

UNITED STATES PATENTS

| | | | |
|---|---|---|---|
| Re. 25,179 | 5/1962 | Ziegler et al. | 260—448 |
| 3,043,857 | 7/1962 | Jenkner | 260—448.2 X |

OTHER REFERENCES

Zeiss: "Organo-Metallic Chemistry," American Chemical Society Monograph No. 147, Reinhold Publishing Corp., N.Y. (1960), pp. 245–46.

DANIEL E. WYMAN, Primary Examiner

P. F. SHAVER, Assistant Examiner

U.S. Cl. X.R.

260—448